(12) United States Patent
Leighton et al.

(10) Patent No.: US 7,716,367 B1
(45) Date of Patent: May 11, 2010

(54) NETWORK PERFORMANCE MONITORING IN A CONTENT DELIVERY SERVICE

(75) Inventors: F. Thomson Leighton, Newtonville, MA (US); Rizwan S. Dhanldina, Cambridge, MA (US); Robert Kleinberg, Somerville, MA (US); Matthew Levine, Somerville, MA (US); Daniel M. Lewin, Charlestown, MA (US); Andrew Parker, Cambridge, MA (US); Adrian Soviani, Cambridge, MA (US); Ravi Sundaram, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 1025 days.

(21) Appl. No.: 10/779,691

(22) Filed: Feb. 18, 2004

Related U.S. Application Data

(63) Continuation of application No. 09/620,658, filed on Jul. 20, 2000, now abandoned.

(51) Int. Cl.
*G06F 15/173* (2006.01)
(52) U.S. Cl. .................. 709/244; 709/226; 709/238; 709/245
(58) Field of Classification Search .............. 709/226, 709/238, 244, 245
See application file for complete search history.

(56) References Cited

U.S. PATENT DOCUMENTS

| | | | |
|---|---|---|---|
| 6,006,264 A | 12/1999 | Colby et al. | |
| 6,108,703 A | 8/2000 | Leighton et al. | |
| 6,185,598 B1 | 2/2001 | Farber | |
| 6,314,565 B1 | 11/2001 | Kenner et al. | |
| 6,330,602 B1 * | 12/2001 | Law et al. | 709/224 |
| 6,374,297 B1 * | 4/2002 | Wolf et al. | 709/226 |
| 6,405,219 B2 * | 6/2002 | Saether et al. | 707/201 |
| 6,421,726 B1 | 7/2002 | Kenner et al. | |
| 6,430,618 B1 * | 8/2002 | Karger et al. | 709/225 |
| 6,553,413 B1 | 4/2003 | Leighton et al. | |
| 2001/0052016 A1 * | 12/2001 | Skene et al. | 709/226 |
| 2002/0052942 A1 * | 5/2002 | Swildens et al. | 709/223 |

OTHER PUBLICATIONS

U.S. Appl. No. 60/182,812; Skene et al.; "Method and System for Name Server Load Balancing"; filed Feb. 16, 2000; whole document.*
Gregory Yerxa, "Network Computing," F5 Networks 3/DNS, Manhasset, vol. 10 ( No. 25), p. 62-64, (Dec. 13, 1999).

* cited by examiner

*Primary Examiner*—Thu Nguyen
*Assistant Examiner*—Thomas J Dailey
(74) *Attorney, Agent, or Firm*—David H. Judson

(57) ABSTRACT

A network architecture or framework that supports hosting and content distribution on a truly global scale allows a Content Provider to replicate and serve its most popular content at an unlimited number of points throughout the world. The inventive framework comprises a set of servers operating in a distributed manner. The actual content to be served is preferably supported on a set of hosting servers (sometimes referred to as ghost servers). This content comprises HTML page objects that, conventionally, are served from a Content Provider site. A base HTML document portion of a Web page is served from the Content Provider's site while one or more embedded objects for the page are served from the hosting servers, preferably, those hosting servers near the client machine. By serving the base HTML document from the Content Provider's site, the Content Provider maintains control over the content.

8 Claims, 6 Drawing Sheets

NETWORK PERFORMANCE MONITORING IN A CONTENT DELIVERY SERVICE

RELATED APPLICATIONS

This application is a continuation of U.S. application Ser. No. 09/620,658, filed Jul. 20, 2000 now abandoned and entitled "Network Performance Monitoring in a Content Delivery Service". This application is related to U.S. Pat. No. 6,108,703, issued Aug. 22, 2000, filed May 19, 1999, which application was based on Ser. No. 60/092,710, filed Jul. 14, 1998.

BACKGROUND OF THE INVENTION

1. Technical Field

This invention relates generally to information retrieval in a computer network. More particularly, the invention relates to a novel method of hosting and distributing content on the Internet that addresses the problems of Internet Service Providers (ISPs) and Internet Content Providers.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives a document or other object formatted according to HTML. A collection of documents supported on a Web server is sometimes referred to as a Web site.

It is well known in the prior art for a Web site to mirror its content at another server. Indeed, at present, the only method for a Content Provider to place its content closer to its readers is to build copies of its Web site on machines that are located at Web hosting farms in different locations domestically and internationally. These copies of Web sites are known as mirror sites. Unfortunately, mirror sites place unnecessary economic and operational burdens on Content Providers, and they do not offer economies of scale. Economically, the overall cost to a Content Provider with one primary site and one mirror site is more than twice the cost of a single primary site. This additional cost is the result of two factors: (1) the Content Provider must contract with a separate hosting facility for each mirror site, and (2) the Content Provider must incur additional overhead expenses associated with keeping the mirror sites synchronized.

In an effort to address problems associated with mirroring, companies such as Cisco, Resonate, Bright Tiger, F5 Labs and Alteon, are developing software and hardware that will help keep mirror sites synchronized and load balanced. Although these mechanisms are helpful to the Content Provider, they fail to address the underlying problem of scalability. Even if a Content Provider is willing to incur the costs associated with mirroring, the technology itself will not scale beyond a few (i.e., less than 10) Web sites.

In addition to these economic and scalability issues, mirroring also entails operational difficulties. A Content Provider that uses a mirror site must not only lease and manage physical space in distant locations, but it must also buy and maintain the software or hardware that synchronizes and load balances the sites. Current solutions require Content Providers to supply personnel, technology and other items necessary to maintain multiple Web sites. In summary, miring requires Content Providers to waste economic and other resources on functions that are not relevant to their core business of creating content.

Moreover, Content Providers also desire to retain control of their content. Today, some ISPs are installing caching hardware that interrupts the link between the Content Provider and the end-user. The effect of such caching can produce devastating results to the Content Provider, including (1) preventing the Content Provider from obtaining accurate hit counts on its Web pages (thereby decreasing revenue from advertisers), (2) preventing the Content Provider from tailoring content and advertising to specific audiences (which severely limits the effectiveness of the Content Provider's Web page), and (3) providing outdated information to its customers (which can lead to a frustrated and angry end user).

There remains a significant need in the art to provide a decentralized hosting solution that enables users to obtain Internet content on a more efficient basis (i.e., without burdening network resources unnecessarily) and that likewise enables the Content Provider to maintain control over its content. The present mention solves these and other problems associated with the prior art.

BRIEF SUMMARY OF THE INVENTION

The disclosed subject matter is a method for Internet content delivery. The method begins by establishing a content delivery network at network locations, the content delivery network comprising a plurality of content servers for serving content resources. The plurality of content servers includes a plurality of subsets of content servers, each subject being located at one of a plurality of Internet data centers. For each Internet Protocol (IP) address block from which requests for content resources are expected to be received, the method generates a candidate list of Internet data centers to be used to service the requests for content resources. The candidate list of Internet data centers is generated using (i) geographic information from one or more Internet registry databases identifying a geographic location of the IP address block, (ii) BGP route information collected from BGP peers participating in BGP (BGP) sessions, (iii) autonomous system (AS) information, and (iv) data collected from one or more network performance metric tests. For the IP address block, the method selects at least one of the Internet data centers from the candidate list to be used to service the requests for content resources. The selected Internet data center for the IP address block is written into a network map. The selecting step is carried out concurrently for each IP address block from which requests for content resources are expected to be received such that the network map comprises the selected Internet data center for each IP address block. The network map is then provided to a domain name service (DNS) associated with the content delivery network. In response to a DNS query received at the domain name service associated with the content delivery network, the network map is used to identify one of the Internet data centers from the candidate list to be used to service a request for a content resource.

The foregoing has outlined some of the more pertinent objects and features of the present invention. These aspects should be construed to be merely illustrative of some of the more prominent features and applications of the invention. Many other beneficial results can be attained by applying the disclosed invention in a different manner or modifying the invention as will be described. Accordingly, other aspects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
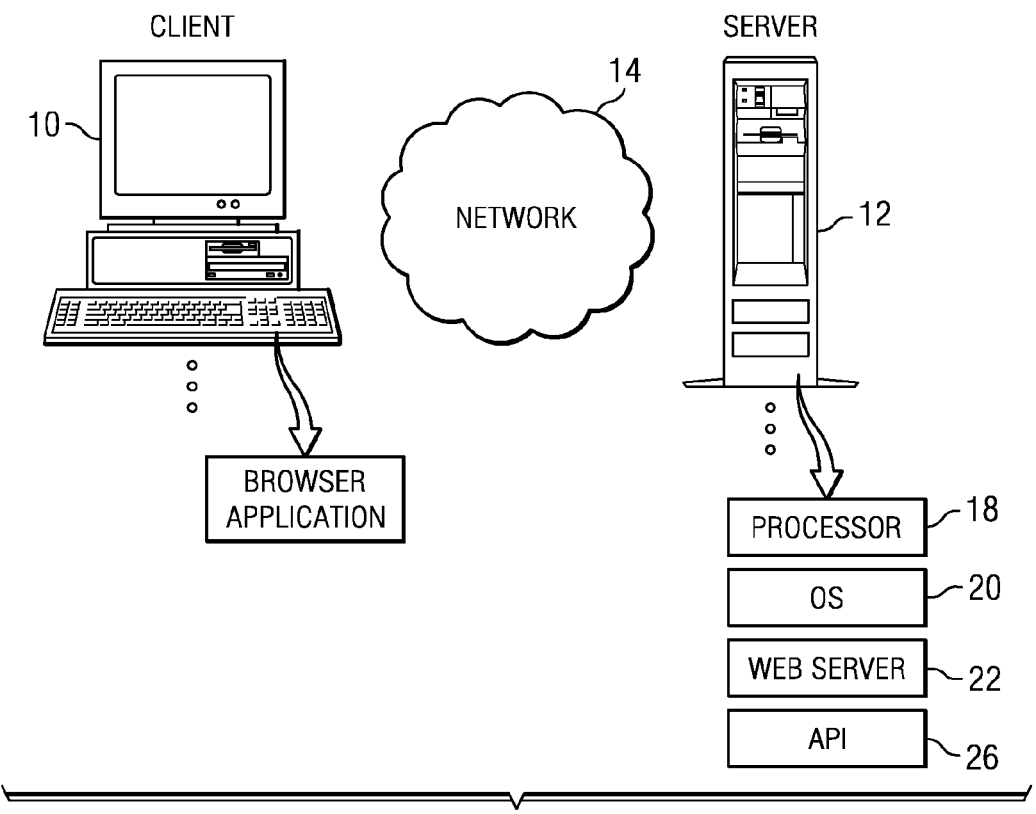
FIG. 1 is a representative client-server system as known in the prior art.

A known Internet client-server system is implemented as illustrated in FIG. 1. A client machine 10 is connected to a Web server 12 via a network 14. For illustrative purposes, network 14 is the Internet, an intranet, an extranet or any other known network. Web server 12 is one of a plurality of servers which are accessible by clients, one of which is illustrated by machine 10. A representative client machine includes a browser 16, which is a known software tool used to access the servers of the network. The Web server supports files (collectively referred to as a "Web" site) in the form of hypertext documents and objects. In the Internet, paradigm, a network path to a server is identified by a so-called Uniform Resource Locator (URL).

A representative Web server 12 is a computer comprising a processor 18, an operating system 20, and a Web server program 22, such as Netscape Enterprise Server. The server 12 also includes a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions or the like.

A representative Web client is a personal computer that is x86-, PowerPC®- or RISC-based, that includes an operating system such as IBM® OS/2® or Microsoft Windows '95, and that includes a Web browser, such as Netscape Navigator 4.0 (or higher), having a Java Virtual Machine (JVM) and support for application plug-ins or helper applications. A client may also be a notebook computer, a handheld computing device (e.g., a PDA), an Internet appliance, or any other such device connectable to the computer network.

Figure 2:
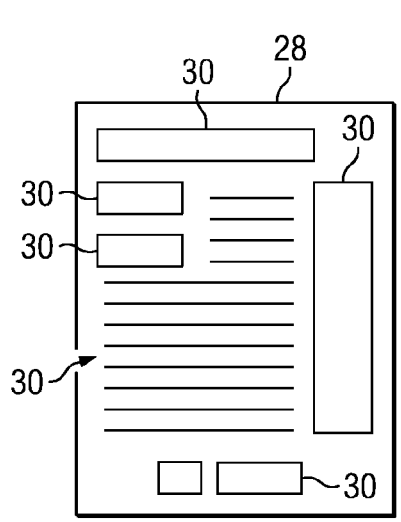
FIG. 2 is a simplified representation of a markup language document illustrating the base document and a set of embedded objects.

As seen in FIG. 2, a typical Web page comprises a markup language (e.g. HTML) master or base document 28, and many embedded objects (e.g., images, audio, video, or the like) 30. Thus, in a typical page, twenty or more embedded images or objects are quite common. Each of these images is an independent object in the Web, retrieved (or validated for change) separately. The common behavior of a Web client, therefore, is to fetch the base HTML document, and then immediately fetch the embedded objects, which are typically (but not always) located on the same server. According to the present invention, preferably the markup language base document 28 is served from the Web server (i.e., the Content Provider site) whereas a given number (or perhaps all) of the embedded objects are served from other servers. As will be seen, preferably a given embedded object is served from a server (other than the Web server itself) that is close to the client machine, that is not overloaded, and that is most likely to already have a current version of the required file.

Figure 3:
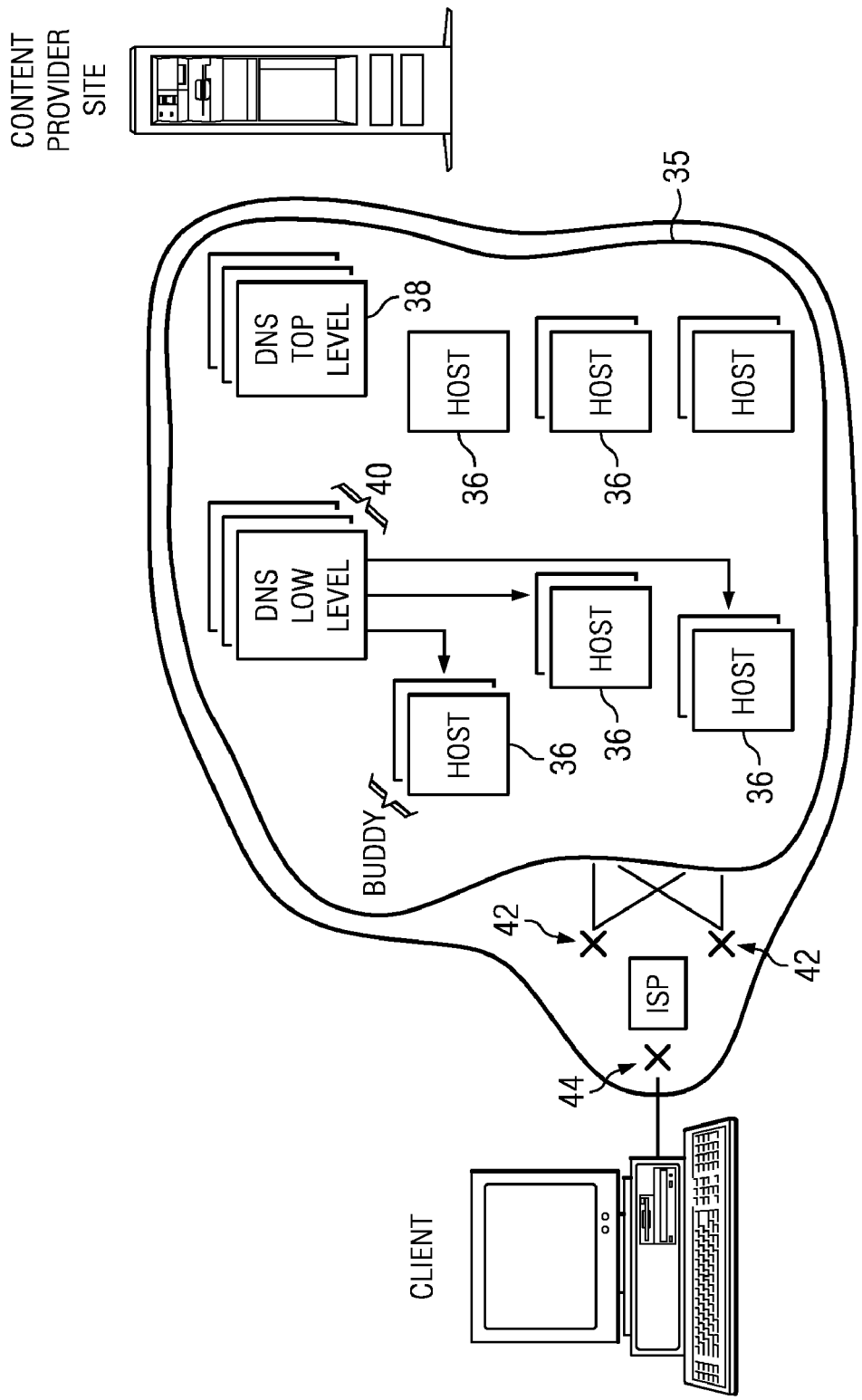
FIG. 3 is a high level diagram of a known global hosting system.

Referring now to FIG. 3, this operation is achieved by the hosting system as described in U.S. Pat. No. 6,108,703. As will be seen, the hosting system 35 comprises a set of widely-deployed servers (or server resources) that form a large, fault-tolerant infrastructure designed to serve Web content efficiently, effectively, and reliably to end users. The servers may be deployed globally, or across any desired geographic regions. As will be seen, the hosting system provides a distributed architecture for intelligently routing and replicating such content. To this end, the global hosting system 35 comprises three (3) basic types of servers (or server resources): hosting servers (sometimes called ghosts) 36, top-level DNS servers 38, and low-level DNS servers 40. Although not illustrated, there may be additional levels in the DNS hierarchy. Alternatively, there may be a single DNS level that combines the functionality of the top level and low-level servers. In this illustrative embodiment, the inventive framework 35 is deployed by an Internet Service Provider (ISP), although this is not a limitation of the present invention. The ISP or ISPs that deploy the inventive global hosting framework 35 preferably have a large number of machines that run both the ghost server component 36 and the low-level DNS component 40 on their networks. These machines are distributed throughout the network; preferably, they are concentrated around network exchange points 42 and network access points 44, although this is not a requirement. In addition, the ISP preferably has a small number of machines running the top-level DNS 38 that may also be distributed throughout the network.

Although not meant to be limiting, preferably a given server used in the framework 35 includes a processor, an operating system (e.g., Linux, UNIX, Windows NT, or the like), a Web server application, and a set of application routines used by the invention. These routines are conveniently implemented in software as a set of instructions executed by the processor to perform various process or method steps as will be described in more detail below. The servers are preferably located at the edges of the network (e.g., in points of presence, or POPS).

Several factors may determine where the hosting servers are placed in the network. Thus, for example, the server locations are preferably determined by a demand driven network map that allows the provider (e.g., the ISP) to monitor traffic requests. By studying traffic patterns, the ISP may optimize the server locations for the given traffic profiles.

According to the disclosure in U.S. Pat. No. 6,108,703, a given Web page (comprising a base HTML document and a set of embedded objects) is served in a distributed manner. Thus, preferably, the base HTML document is served from the Content Provider that normally hosts the page. The embedded objects, or some subset thereof, are preferentially served from the hosting servers 36 and, specifically, given hosting servers 36 that are near the client machine that in the first instance initiated the request for the Web page. In addition, preferably loads across the hosting servers are balanced to ensure that a given embedded object may be efficiently served from a given hosting server near the client when such client requires that object to complete the page.

Figure 4:
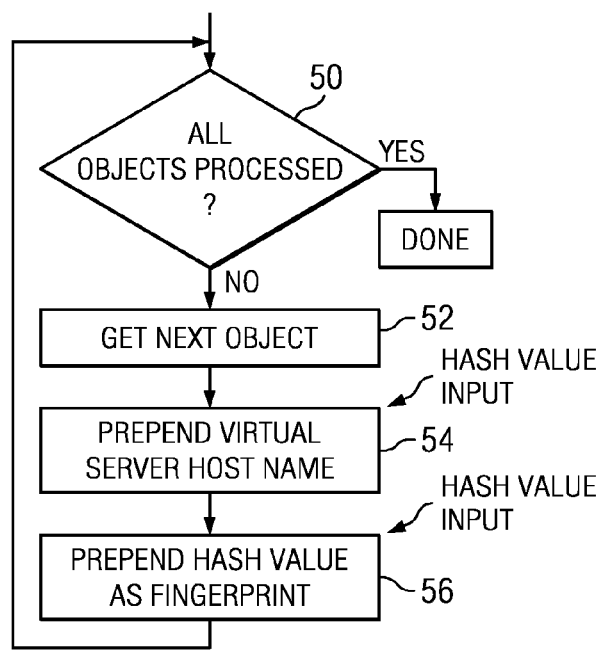
FIG. 4 is a simplified flowchart illustrating a known method of processing a Web page to modify embedded object URLS.

To serve the page contents in this manner, the URL associated with an embedded object is modified. As is well-known, each embedded object that may be served in a page has its own URL. Typically, the URL has a hostname identifying the Content Provider's site from where the object is conventionally served, i.e., without reference to the present invention. According to the invention, the embedded object URL is first modified, preferably in an off-line process, to condition the URL to be served by the global hosting servers. A flowchart illustrating the preferred method for modifying the object URL is illustrated in FIG. 4.

The routine begins at step 50 by determining whether all of the embedded objects in a given page have been processed. If so, the routine ends. If not, however, the routine gets the next embedded object at step 52. At step 54, a virtual server hostname is prepended into the URL for the given embedded object. The virtual server hostname includes a value (e.g., a number) that is generated, for example, by applying a given hash function to the URL. As is well-known, a hash function takes arbitrary length bit strings as inputs and produces fixed length bit strings (hash values) as outputs. Such functions satisfy two conditions: (1) it is infeasible to find two different inputs that produce the same hash value, and (2) given an input and its hash value, it is infeasible to find a different input with the same hash value. In step 54, the URL for the embedded object is hashed into a value xx,xxx that is then included in the virtual server hostname. This step randomly distributes the object to a given virtual server hostname.

The technique described in U.S. Pat. No. 6,108,703 is not limited to generating the virtual server hostname by applying a hash function as described above. As an alternative and preferred embodiment, a virtual server hostname is generated as follows. Consider the representative hostname a1234.g.akamaitech.net. The 1234 value, sometimes referred to as a serial number, preferably includes information about the object such as its size (big or small), its anticipated popularity, the date on which the object was created, the identity of the Web site, the type of object (e.g., movie or static picture), and perhaps some random bits generated by a given random function. Of course, it is not required that any given serial number encode all of such information or even a significant number of such components. Indeed, in the simplest case, the serial number may be a simple integer. In any event, the information is encoded into a serial number in any convenient manner. Thus, for example, a first bit is used to denote size, a second bit is used to denote popularity, a set of additional bits is used to denote the date, and so forth. As noted above in the hashing example, the serial number is also used for load balancing and for directing certain types of traffic to certain types of servers. Typically, most URLs on the same page have the same serial number to minimize the number of distinguished name (DN) accesses needed per page. This requirement is less important for larger objects.

Thus, according to U.S. Pat. No. 6,108,703, a virtual server hostname is prepended into the URL for a given embedded object, and this hostname includes a value (or serial number) that is generated by applying a given function to the URL or object. That function may be a hash function, an encoding function, or the like.

Turning now back to the flowchart, the routine then continues at step 56 to include a given value in the object's URL. Preferably, the given value is generated by applying a given hash function to the embedded object. This step creates a unique fingerprint of the object that is useful for determining whether the object has been modified. Thereafter, the routine returns to step 50 and cycles.

Figure 5:
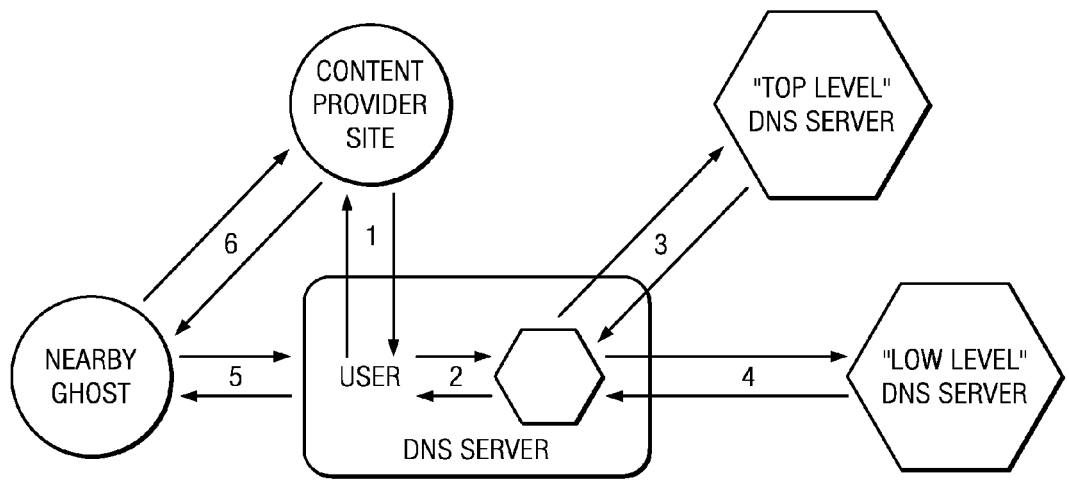
FIG. 5 is a simplified state diagram illustrating how the the system of FIG. 3 responds to an HTTP request for a Web page.

With the above as background, the inventive global hosting framework is now described in the context of a specific example. In particular, it is assumed that a user of a client machine in Boston requests a Content Provider Web page normally hosted in Atlanta. For illustrative purposes, it is assumed that the Content Provider is using the global hosting architecture within a network, which may be global, international, national, regional, local or private. FIG. 5 shows the various components of the system and how the request from the client is processed. This operation is not to be taken by way of limitation, as will be explained.

Step 1: The browser sends a request to the Provider's Web site (Item 1). The Content Provider site in Atlanta receives the request in the same way that it does as if the global hosting framework were not being implemented. The difference is in what is returned by the Provider site. Instead of returning the usual page, according to the invention, the Web site returns a page with embedded object URLs that are modified according to the method illustrated in the flowchart of FIG. 4. As previously described, the URLs preferably are changed as follows:

Assume that there are 100,000 virtual ghost servers, even though there may only be a relatively small number (e.g., 100) physically present on the network. These virtual ghost servers or virtual ghosts are identified by the hostname: ghostxxxxx.ghosting.com, where xxxxx is replaced by a number between 0 and 99,999. After the Content Provider Web site is updated with new information, a script executing on the Content Provider site is run that rewrites the embedded URLs. Preferably, the embedded URLs names are hashed into numbers between 0 and 99,999, although this range is not a limitation of the present invention. An embedded URL is then switched to reference the virtual ghost with that number. For example, the following is an embedded URL from the Provider's site:

<IMG SRC=http://www.prodiver.com/TECH/images/space.story.gif>

If the serial number for the object referred to by this URL is the number 1467, then preferably the URL is rewritten to read:

<IMG SRC=http://ghost1477.gosting.akamai.com/www-.provider.com/TECH/images/space.story.gif>.

The use of serial numbers in this manner distributes the embedded URLs roughly evenly over the 100,000 virtual ghost server names. Note that the Provider site can still personalize the page by rearranging the various objects on the screen according to individual preferences. Moreover, the Provider can also insert advertisements dynamically and count how many people view each ad.

According to the preferred embodiment, an additional modification to the embedded URLs is made to ensure that the global hosting system does not serve stale information. As previously described, preferably a hash of the data contained in the embedded URL is also inserted into the embedded URL itself. That is, each embedded URL may contain a fingerprint of the data to which it points. When the underlying information changes, so does the fingerprint, and this prevents users from referencing old data.

The second hash takes as input a stream of bits and outputs what is sometimes referred to as a fingerprint of the stream. The important property of the fingerprint is that two different streams almost surely produce two different fingerprints. Examples of such hashes are the MD2 and MD5 hash functions, however, other more transparent methods such as a simple checksum may be used. For concreteness, assume that the output of the hash is a 128 bit signature. This signature can be interpreted as a number and then inserted into the embedded URL. For example, if the hash of the data in the picture space.story.gif from the Provider web site is the number 28765, then the modified embedded URL would actually look as follows: <IMG SRC=http://ghost1467.ghosting.akamai.com/28765/www.provider.com/TECH/images/space.story.gif>.

Whenever a page is changed, preferably the hash for each embedded URL is recomputed and the URL is rewritten if necessary. If any of the URL's data changes, for example, a new and different picture is inserted with the name space.story.gif, then the hash of the data is different and therefore the URL itself will be different. This scheme prevents the system from serving data that is stale as a result of updates to the original page.

For example, assume that the picture space.story.gif is replaced with a more up-to-date version on the Content Provider server. Because the data of the pictures changes, the hash of the URL changes as well. Thus, the new embedded URL looks the same except that a new number is inserted for the fingerprint. Any user that requests the page after the update receives a page that points to the new picture. The old picture is never referenced and cannot be mistakenly returned in place of the more up-to-date information.

In summary, preferably there are two hashing operations that are done to modify the pages of the Content Provider. First, hashing can be a component of the process by which a serial number is selected to transform the domain name into a virtual ghost name. As will be seen, this first transformation serves to redirect clients to the global hosting system to retrieve the embedded URLs. Next, a hash of the data pointed to by the embedded URLs is computed and inserted into the URL. This second transformation serves to protect against serving stale and out-of-date content from the ghost servers. Preferably, these two transformations are performed off-line and therefore do not pose potential performance bottlenecks.

Generalizing, the preferred URL schema is as follows. The illustrative domain www.damainname.com/frontpage.jpg is transformed into:

xxxx.yy.zzzz.net/aaaa/www.domainname.com/frontpage.jpg, where xxxx=serial number field
yy=lower level DNS field
zzzz=top level DNS field
aaaa=other information (e.g., fingerprint) field.

If additional levels of the DNS hierarchy are used, then there may be additional lower level DNS fields, e.g., xxxx.$Y_1Y_1.Y_2Y_2$ zzz.net/aaaa/ . . . .

Step 2: After receiving the initial page from the Content Provider site, the browser needs to load the embedded URLs to display the page. The first step in doing this is to contact the DNS server on the users machine (or at the user's ISP) to resolve the altered hostname, in this case: ghost1467.ghosting.akamai.com. As will be seen, the global hosting architecture of the present invention manipulates the DNS system so that the name is resolved to one of the ghosts that is near the client and is likely to have the page already. To appreciate how this is done, the following describes the progress of the DNS query that was initiated by the client.

Step 3: As previously described, preferably there are two types of DNS servers in the inventive system: top-level and low-level. The top level DNS servers 38 for ghosting.com have a special function that is different from regular DNS servers like those of the .com domain. The top level DNS servers 38 include appropriate control routines that are used to determine where in the network a user is located, and then to direct the user to an akamai.com (i.e., a low level DNS) server 40 that is close-by. Like the .com domain, akamai.com preferably has a number of top-level DNS servers 38 spread throughout the network for fault tolerance. Thus, a given top level DNS server 38 directs the user to a region in the Internet (having a collection of hosting servers 36 that may be used to satisfy the request for a given embedded object) whereas the low level DNS server 40 (within the identified region) identifies a particular hosting server within that collection from which the object is actually served.

More generally, as noted above, the DNS process can contain several levels of processing, each of which serves to better direct the client to a ghost server. The ghost server name can also have more fields. For example, "a123.g.g.akamaitech.net" may be used instead of "a123.ghost.akamai.com." If only one DNS level is used, a representative URL could be "a123.akamai.com."

Although other techniques may be used, the user's location in the network preferably is deduced by looking at the IP address of the client machine making the request. In the present example, the DNS server is running on the machine of the user, although this is not a requirement. If the user is using an ISP DNS server, for example, the routines make the assumption that the user is located near (in the Internet sense) this server. Alternatively, the user's location or IP address could be directly encoded into the request sent to the top level DNS. To determine the physical location of an IP address in the network, preferable, the top level DNS server builds a network map that is the used to identify the relevant location.

Thus, for example, when a request comes in to a top level DNS for a resolution for a1234.g.akamaitech.net, the top level DNS looks at the return address of the requester and then formulates the response based on that address according to a network map. In this example, the a1234 is a serial number, the g is a field that refers to the lower level DNS, and akamaitech refers to the top level DNS. The network map preferably contains a list of all Internet Protocol (IP) blocks and, for each IP block, the map determines where to direct the request. The map preferably is updated continually based on network conditions and traffic.

After determining where in the network the request originated, the top level DNS server redirects the DNS request to a low level DNS server close to the user in the network. The ability to redirect requests is a standard feature in the DNS system. In addition, this redirection can be done in such a way that if the local low level DNS server is down, there is a backup server that is contacted.

Preferably, the TTL (time to live) stamp on these top level DNS redirections for the ghosting.com domain is set to be long. This allows DNS caching at the user's DNS servers and/or the ISP's DNS servers to prevent the top level DNS servers from being overloaded. If the TTL for ghosting.akamai.com in the DNS server at the user's machine or ISP has expired, then a top level server is contacted, and a new redirection to a local low level ghosting.akamai.com DNS server is returned with a new TTL stamp. It should be noted the system does not cause a substantially larger number of top level DNS lookups than what is done in the current centralized hosting solutions. This is because the TTL of the top level redirections are set to be high and, thus, the vast majority of users are directed by their local DNS straight to a nearby low level ghosting.akamai.com DNS server.

Moreover, fault tolerance for the top level DNS servers is provided automatically by DNS similarly to what is done for the popular .com domain. Fault tolerance for the low level DNS servers preferably is provided by returning a list of possible low level DNS servers instead of just a single server. If one of the low level DNS servers is down, the user will still be able to contact one on the list that is up and running.

Fault tolerance can also be handled via an "overflow control" mechanism wherein the client is redirected to a low-level DNS in a region that is known to have sufficient capacity to serve the object. This alternate approach is very useful in scenarios where there is a large amount of demand from a specific region or when there is reduced capacity in a region. In general, the clients are directed to regions in a way that minimizes the overall latency experienced by clients subject to the constraint that no region becomes overloaded. Minimizing overall latency subject to the regional capacity constraints preferably is achieved using a min-cost multicommodity flow algorithm.

Step 4: At this point, the user has the address of a close-by ghosting.com DNS server 38. The user's local DNS server contacts the close-by low level DNS server 40 and requests a translation for the name ghost 1467.ghosting.akamai.com. The local DNS server is responsible for returning the IP address of one of the ghost servers 36 on the network that is close to the user, not overloaded, and most likely to already have the required data.

The basic mechanism for mapping the virtual ghost names to real ghosts is hashing. One preferred technique is so-called consistent hashing, as described in U.S. Pat. No. 6,430,618, issued Aug. 6, 2002, and in U.S. Pat. No. 6,553,420, issued Apr. 22, 2003, each titled Method And Apparatus For Distributing Requests Among A Plurality Of Resources, and owned by the Massachusetts Institute of Technology, which patents are incorporated herein by reference. Consistent hash functions make the system robust under machine failures and crashes. It also allows the system to grow gracefully, without changing where most items are located and without perfect information about the system.

According to the disclosure in U.S. Pat. No. 6,108,703, the virtual ghost names may be hashed into real ghost addresses using a table lookup, where the table is continually updated based on network conditions and traffic in such a way to insure load balancing and fault tolerance. Preferably, a table of resolutions is created for each serial number. For example, serial number 1 resolves to ghost 2 and 5, serial number 2 resolves to ghost 3, serial number 3 resolves to ghosts 2,3,4, and so forth. The goal is to define the resolutions so that no ghost exceeds its capacity and that the total number of all ghosts in all resolutions is minimized. This is done to assure that the system can take maximal advantage of the available memory at each region. This is a major advantage over existing load balancing schemes that tend to cache everything everywhere or that only cache certain objects in certain locations no matter what the loads are. In general, it is desirable to make assignments so that resolutions tend to stay consistent over time provided that the loads do not change too much in a short period of time. This mechanism preferably also takes into account how close the ghost is to the user, and how heavily loaded the ghost is at the moment.

Note that the same virtual ghost preferably is translated to different real ghost addresses according to where the user is located in the network. For example, assume that ghost server 18.98.0.17 is located in the United States and that ghost server 132.68.1.28 is located in Israel. A DNS request for ghost1487.ghosting.akamai.com originating in Boston will resolve to 18.98.0.17, while a request originating in Tel-Aviv will resolve to 132.68.1.28.

The low-level DNS servers monitor the various ghost servers to take into account their loads while translating virtual ghost names into real addresses. This is handled by a software routine that runs on the ghosts and on the low level DNS servers. In one embodiment, the load information is circulated among the servers in a region so that they can compute resolutions for each serial number. One algorithm for computing resolutions works as follows. The server first computes the projected load (based on number of user requests) for each serial number. The serial numbers are then processed in increasing order of load. For each serial number, a random priority list of desired servers is assigned using a consistent hashing method. Each serial number is then resolved to the smallest initial segment of servers from the priority list so that no server becomes overloaded. For example, if the priority list for a serial number is 2,5,3,1,6, then an attempt is made first to try to map the load for the serial number to ghost 2. If this overloads ghost 2, then the load is assigned to both ghosts 2 and 5. If this produced too much load on either of those servers, then the load is assigned to ghosts 2,3, and 5, and so forth. The projected load on a server can be computed by looking at all resolutions that contain that server and by adding the amount of load that is likely to be sent to that server from that serial number. This method of producing resolutions is most effective when used in an iterative fashion, wherein the assignments starts in a default state, where every serial number is mapped to every ghost. By refining the resolution table according to the previous procedure, the load is balanced using the minimum amount of replication (thereby maximally conserving the available memory in a region).

The TTL for these low level DNS translations is set to be short to allow a quick response when heavy load is detected on one of the ghosts. The TTL is a parameter that can be manipulated by the system to insure a balance between timely response to high load on ghosts and the load induced on the low level DNS servers. Note, however, that even if the TTL for the low level DNS translation is set to 1-2 minutes, only a few of the users actually have to do a low level DNS lookup. Most users will see a DNS translation that is cached on their machine or at their ISP. Thus, most users go directly from their local DNS server to the close-by ghost that has the data they want. Those users that actually do a low level DNS lookup have a very small added latency, however this latency is small compared to the advantage of retrieving most of the data from close by.

As noted above, fault tolerance for the low level DNS servers is provided by having the top level DNS return a list of possible low level DNS servers instead of a single server address. The user's DNS system caches this list (part of the standard DNS system), and contacts one of the other servers on the list if the first one is down for some reason. The low level DNS servers make use of a standard feature of DNS to provide an extra level of fault tolerance for the ghost servers.

When a name is translated, instead of returning a single name, a list of names is returned. If for some reason the primary fault tolerance method for the ghosts (known as the Buddy system, which is described below) fails, the client browser will contact one of the other ghosts on the list.

Step 5: The browser then makes a request for an object named a123.ghosting.akamai.com/ . . . /www.provider.com/TECH/images/space.story.gif from the close-by ghost. Note that the name of the original server (www.provider.com) preferably is included as part of the URL. The software running on the ghost parses the page name into the original host name and the real page name. If a copy of the file is already stored on the ghost, then the data is returned immediately. If, however, no copy of the data on the ghost exists, a copy is retrieved from the original server or another ghost server. Note that the ghost knows who the original server was because the name was encoded into the URL that was passed to the ghost from the browser. Once a copy has been retrieved it is returned to the user, and preferably it is also stored on the ghost for answering future requests.

As an additional safeguard, it may be preferable to check that the user is indeed close to the server. This can be done by examining the IP address of the client before responding to the request for the file. This is useful in the rare case when the client's DNS server is far away from the client. In such a case, the ghost server can redirect the user to a closer server (or to another virtual address that is likely to be resolved to a server that is closer to the client). If the redirect is to a virtual server, then it must be tagged to prevent further redirections from taking place. In the preferred embodiment, redirection would only be done for large objects; thus, a check may be made before applying a redirection to be sure that the object being requested exceeds a certain overall size.

Performance for long downloads can also be improved by dynamically changing the server to which a client is connected based on changing network conditions. This is especially helpful for audio and video downloads (where the connections can be long and where quality is especially important). In such cases, the user can be directed to an alternate server in mid-stream. The control structure for redirecting the client can be similar to that described above, but it can also include software that is placed in the client's browser or media player. The software monitors the performance of the client's connection and perhaps the status of the network as well. If it is deemed that the client's connection can be improved by changing the server, then the system directs the client to a new server for the rest of the connection.

The global hosting scheme of U.S. Pat. No. 6,108,703 is a way for global ISPs or conglomerates of regional ISPs to leverage their network infrastructure to generate hosting revenue, and to save on network bandwidth. An ISP offering the inventive global hosting scheme can give content providers the ability to distribute content to their users from the closest point on the ISPs network, thus ensuring fast and reliable access. Guaranteed web site performance is critical for any web-based business, and global hosting allows for the creation of a service that satisfies this need.

Global hosting according to U.S. Pat. No. 6,108,703 also allows an ISP to control how and where content traverses its network. Global hosting servers can be set up at the edges of the ISP's network (at the many network exchange and access points, for example). This enables the ISP to serve content for sites that it hosts directly into the network exchange points and access points. Expensive backbone links no longer have to carry redundant traffic from the content provider's site to the network exchange and access points. Instead, the content is served directly out of the ISP's network, freeing valuable network resources for other traffic.

Although global hosting reduces network traffic, it is also a method by which global ISPs may capture a piece of the rapidly expanding hosting market, which is currently estimated at over a billion dollars a year.

The global hosting solution also provides numerous advantages to Content Providers, and, in particular, an efficient and cost-effective solution to improve the performance of their Web sites both domestically and internationally. The inventive hosting software ensures Content Providers with fast and reliable Internet access by providing a means to distribute content to their subscribers from the closest point on an ISP's network. In addition to other benefits described in more detail below, the global hosting solution also provides the important benefit of reducing network traffic.

Once inexpensive global hosting servers are installed at the periphery of an ISP's network (i.e., at the many network exchange and access points), content is served directly into network exchange and access points. As a result of this efficient distribution of content directly from an ISP's network, the system as described in U.S. Pat. No. 6,108,703 substantially improves Web site performance. In contrast to current content distribution systems, the global hosting solution as described in U.S. Pat. No. 6,108,703 does not require expensive backbone links to carry redundant traffic from the Content Provider's Web site to the network exchange and access points.

Figure 6:
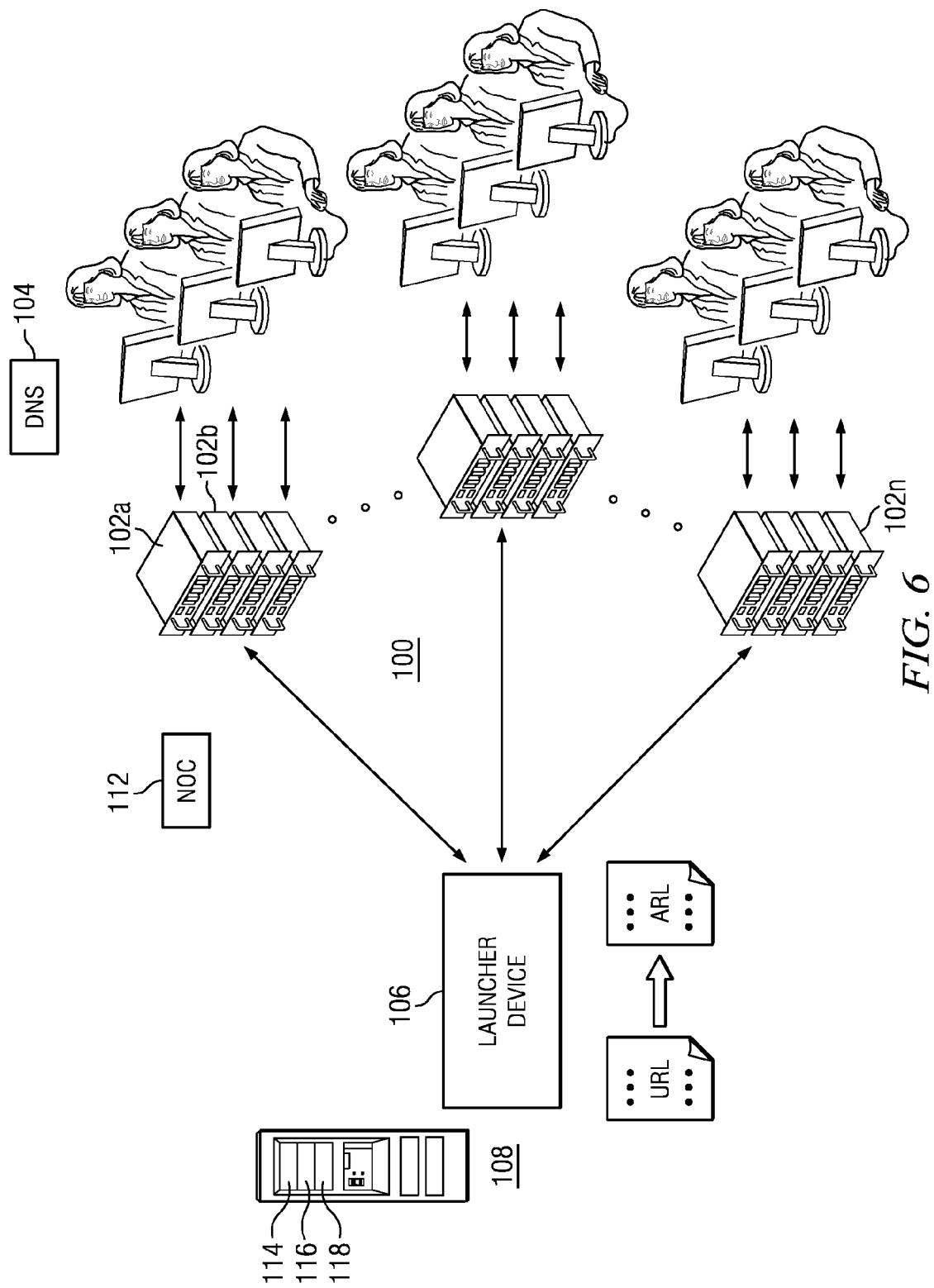
FIG. 6 is a block diagram of a preferred embodiment of a content delivery service in which the present invention may be implemented.

FIG. 6 is a diagram illustrating a preferred embodiment of the content delivery service in which the present invention may be implemented. As described above, the content delivery service comprises a (potentially) global network 100 of content delivery servers 102a-n, a dynamic domain name service (DNS) system 104, and a launcher tool 106 that allows content to be tagged for inclusion on the network. Generally, the content delivery system allows the network of content delivery servers to serve a large number of clients efficiently. Although not meant to be limiting, a typical content server is a Pentium-based caching appliance running the Linux operating system with about 1 GB RAM and between about 40-80 GB of disk storage. As also seen in FIG. 6, the content delivery service may include a network operations center 112 for monitoring the network to ensure that key processes are running, systems have not exceeded capacity, and that regions are interacting properly. A content provider also has access to a monitoring suite 114 that includes tools for both realtime and historic analysis of customer data. One tool is a traffic analyzer 116 that provides multiple monitoring views that enable quick access to network and customer-specific traffic information. A reporter 118 allows for viewing of historical data.

As has been described, high-performance Internet content delivery is provided by directing requests for media-rich web objects to the content delivery service network. In particular, content is first tagged for delivery by the launcher tool 106, which is executed by a content provider at the content providers web site 108. The launcher 106 converts URLs to modified resource locators, called ARLs for convenience. FIG. 7 illustrates how the web site 208 operates after given embedded objects in a web page have been modified with ARLs. As illustrated, the content provider's web servers 200 (prior to the present invention) serve the basic or "base" HTML page 202. However, the URLs of the embedded objects within that page have been modified (into ARLs) and no longer resolve to the content provider's site, but rather to the content delivery service network 205.

Figure 7A:
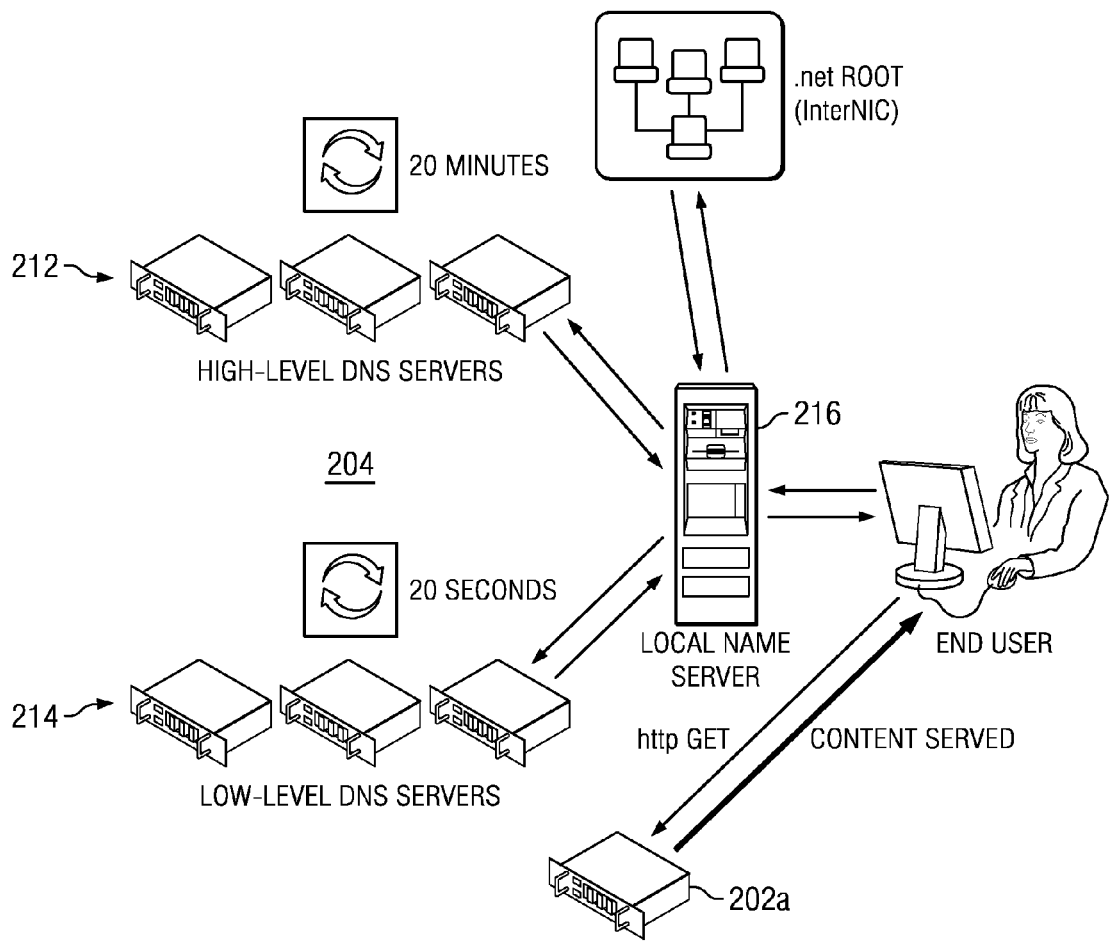
FIG. 7A illustrates how the DNS system resolves an end user request for an ARL.
Figure 7:
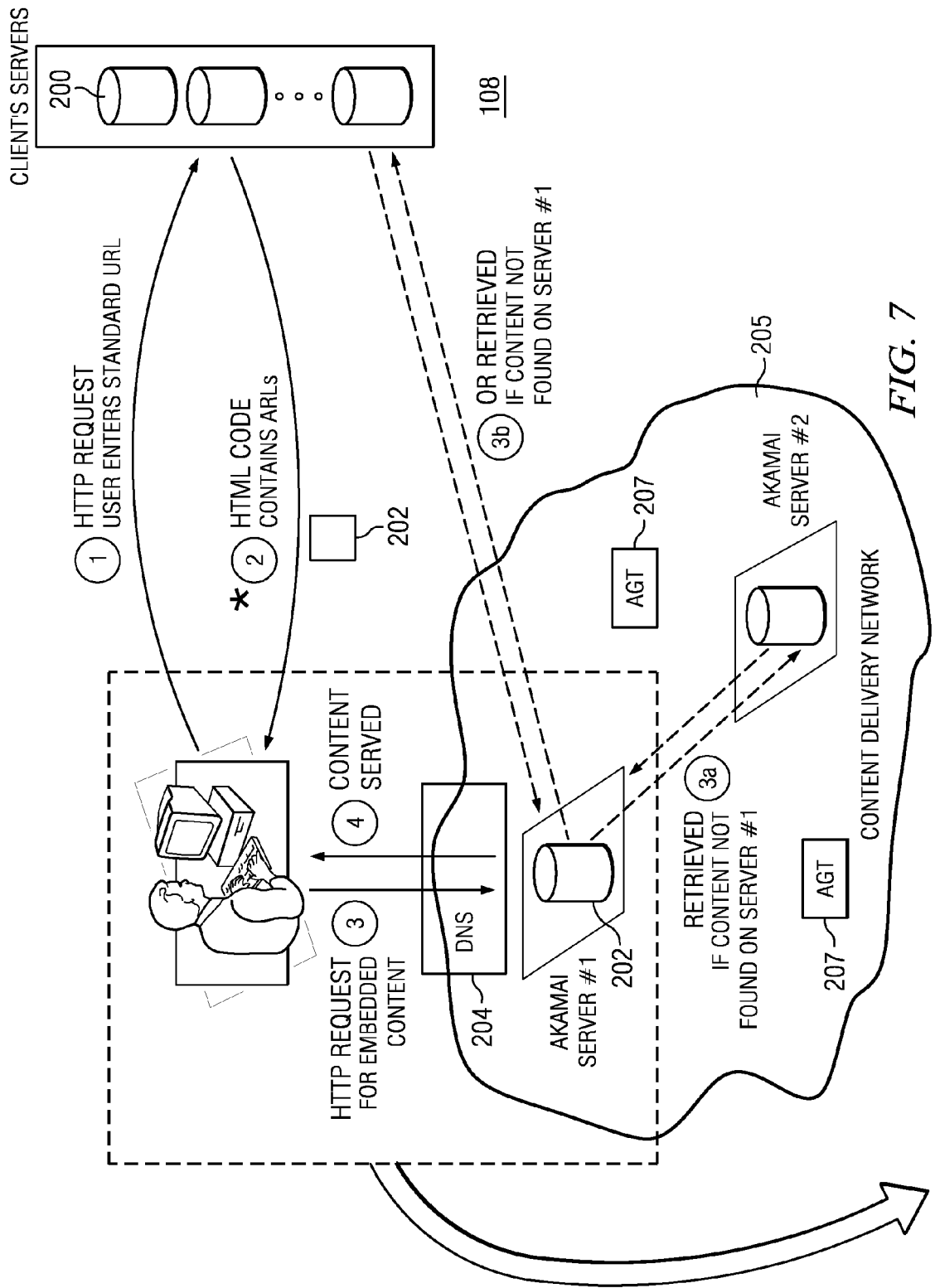
FIG. 7 is a simplified block diagram illustrating how a content provider site operates with the content delivery service.

As indicated in FIG. 7A, the dynamic DNS system 204 resolves these ARLs to optimal network servers 202 rather than to the original web servers 200. Specifically, the DNS system 204 ensures that each request for an ARL is directed to the content server, e.g., server 202a, that will most quickly service the request and that is likely to support the requested object. The DNS system 204 preferably comprises a set one or more high level DNS servers 212 that identify a particular region within the content delivery service network 205 to which a given ARL request (e.g., a9.g.akamaitech.net) should be directed. The DNS system 204 also includes a set of one or more low level DNS servers 214 within each such region. Low level DNS is used to identify the particular server 202a that should be the target of the given ARL request. High level DNS server match clients' local name servers (e.g., local name server 216) with the low level DNS servers that can answer their queries most quickly, thus providing clients with fast access to up-to-date server mappings. To that end, mapping agents 207 provide each high level DNS server 212 with a high level map, which is generated every few minutes, that optimally maps IP blocks to sets of low level DNS servers. Each low level DNS server is assigned to direct requests to one region of content servers, usually the region in which the low level DNS server itself resides. In each IP block-to-{set of low level DNS servers} mapping in the high level map, all of the low level DNS servers in the set are assigned to the same region, so it is, in effect, a mapping of IP blocks to server regions. A fast map, generated every few seconds, assigns a server region to each low level DNS server. The content delivery service includes appropriate control routines to create the request-to-server mappings that are based on up-to-the-second information on current Internet traffic conditions (derived from the mapping agents). These mappings enable the service to route end-user requests around network problem areas and delivers content to users in the fastest, most efficient way possible.

As described above, the present invention uses one or more network maps to facilitate resolution of web browser requests. To this end, monitoring agents deployed throughout the content delivery service's network preferably continuously measure the performance of the Internet They preferably combine a number of different performance metrics to determine the cost of communication between regions of end-user machines (IP blocks) and servers in the network. The performance metrics used include one or more of the following: network link latency, packet loss rates at routers, available link capacity, network hop distance, AS path information, and test page download times. All of the measurements are aggregated via a fat tree network overlay and transferred to mapping agents. In a fat tree, the capacity of links and nodes increases in higher levels at the tree, with the root node having the largest capacity. The mapping agents input the computed communication costs into a large-scale global optimization algorithm that constructs the maps used by the high level and low level DNS servers. In one illustrative embodiment, the performance metrics include geo-routing data, BGP data, and ICMP (ping) data, which data is then integrated to facilitate the map generation process. A more detailed description of a preferred map generation technique is set forth below.

The job of the high level DNS servers is to match clients' local name servers with the content delivery service's low level DNS servers that can answer the queries most quickly, this providing clients with fast access to up-to-date server mappings. To that end, the mapping agents each high level DNS server with a table (a high-level map) that optimally maps IP blocks to sets of low level DNS servers. Upon receiving a query from a local name server, a high level DNS server returns a list of low level DNS servers that the high-level map associates with the IP address of the local name server making the query. This table, or high-level map, is preferably recomputed based on new traffic measurements and redistributed to high level DNS servers every 5-10 minutes; therefore, to keep local name servers up-to-date with changing traffic conditions, the TTL on high level DNS responses is preferably 20 minutes.

Figure 8:
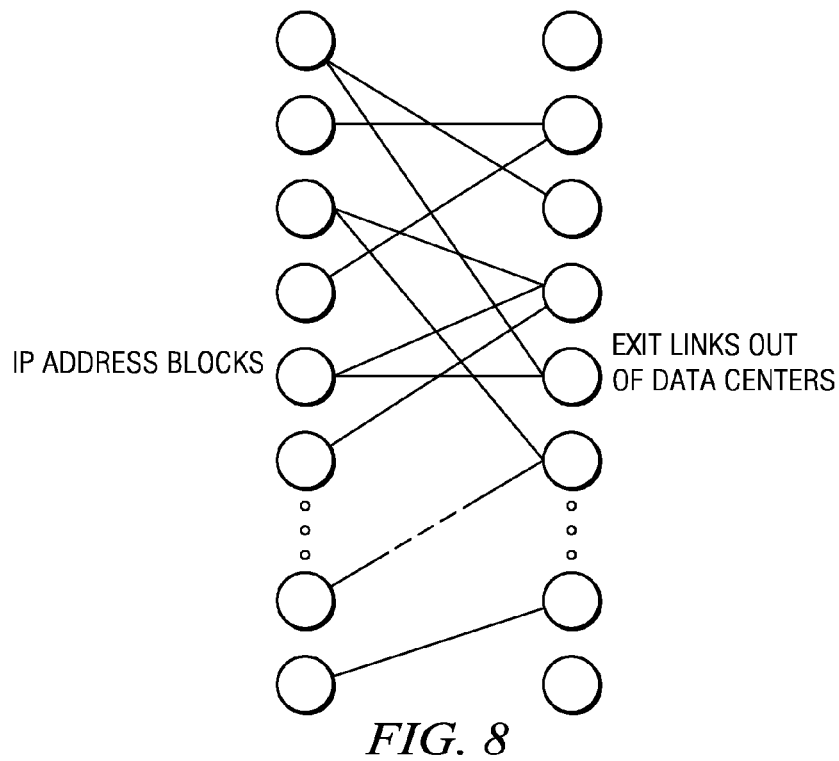
FIG. 8 is a bipartite graph used for high level DNS map generation.

To compute this table (called the high-level map), the mapping agents set up a bipartite graph of the following form: approximately 180,000 nodes on the left each representing the current load coming from an IP block; and approximately 10,000 nodes on the right, each representing a single exit link at a data center (e.g., 100 Mbps link from AboveNet San Jose—Level 3). FIG. 8 illustrates the bipartite graph for HLDNS map generation. The graph becomes fully connected, meaning there is a link between every (IP block, exit link) pair. Each link is assigned a cost based on the collected network measurements that reflects the quality of communication between the given IP block and exit link location. A multi-commodity bipartite min-cost flow algorithm is run on this graph, resulting in an optimal mapping of IP blocks to exit links (i.e., total cost across all links is minimized). An IP block-to-{set of LLDNS servers) mapping is then derived using a statically defined table that associates a (usually) nearby LLDNS server with each exit link. This final mapping is stored in a table and distributed to all high level DNS servers.

The table used by high level DNS servers can take up to 10 minutes to compute because it takes into account each of around 180,000 IP blocks separately. To map requests to servers optimally, based on up-to-the-second traffic conditions, the low level DNS servers may be provided with a second, fast map, which is updated every 10 seconds. They use the fast map along with a sophisticated load-balancing algorithm to direct each request to the optimal ghost server.

Figure 9:
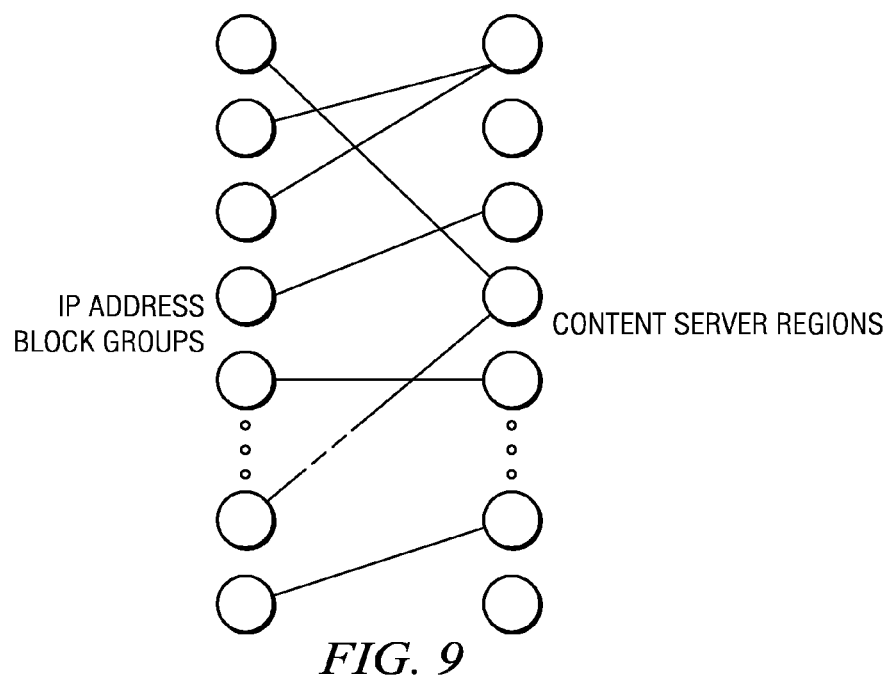
FIG. 9 is a bipartite graph used for fast map generation.

Each low level DNS server is assigned to direct requests to one region of content serve, usually the region in which the low level DNS server itself resides. In each IP block-to-(set of LLDNS servers) mapping in the high level map, all of the LLDNS servers in the set are assigned to the same region, so it is, in effect, a mapping of IP blocks to server regions. Preferably, every few seconds (e.g., 10), a fast map is computed to refine the decision made by the high level map. The fast map assigns a server region to each LLDNS server. To achieve this fast response time, the scale of the matching problem is reduced by grouping together IP blocks that were matched to the same set of LLDNS servers in the high-level map. A second bipartite graph is set up, as shown in FIG. 9, with each of around 10,000 nodes on the left representing the aggregate load from an IP block group. Each of approximately 100 nodes on the right represents the capacity of a particular server region. As before, the graph becomes fully connected with cost links representing the cost of communication between each IP block group and server region. Running a bipartite min-cost flow on this much smaller graph takes only a few seconds, producing a single mapping from each IP block group to a region. The LLDNS servers associated with each IP block group (in the high-level map) are then assigned to serve the corresponding server region. In this way, the content delivery service ensures that client requests are sent to the server region that will service them most quickly.

The following is a detailed description of a preferred technique for generating network maps for use in the content delivery service.

The Map directs IP addresses to data centers. The Map is installed on the top-level name server and is updated as network conditions change. Five types of information make up a Map:

1. GEO Geographic information gleaned from the three main registration databases: RIPE, ARIN, and APNIC.
2. BGP Information obtained from BGP (Border Gateway Protocol) routing tables. Machines in the field act as silent peers collecting and aggregating routing information.
3. AS Autonomous System numbers of the various IP blocks, also obtained by parsing the routing tables.
4. VIP Information obtained from Keynote, a web performance measuring service. This information is used to map certain parts of the Internet to specific data centers with a view to improving the Keynote measurements.
5. Traceroute Traceroutes are run and the information is collected and processed.

Geographic information is relatively static, but the BGP, AS, and VIP information are dynamically assembled. All the information is collectively used to generate a candidate list of data centers for each IP block. Once the candidate list is generated, a min-cost flow algorithm selects one data center for each IP block.

In order to map IP addresses to geographic locations, a geographic map based on information from a number of sources is created. The main source of information was the WHOIS database provided by ARIN, APNIC, and RIPE.

Internet routers use the Border Gateway Protocol (BGP) to build their routing tables. BGP peers (routers running BGP) exchange route advertisements, which are then examined and installed in the tables. A route for a particular CIDR (Classless Inter-domain Routing) block, e.g., 128.2.0.0/16, contains information including the next hop (an IP address) on the path to the CIDR block, and the list of autonomous systems (AS) that the route passes through on the way to the block. For more information on BGP, see *Internet Routing Architectures*, written by Bassam Halabi (Indianapolis: Cicso Press, 1997).

A map generation algorithm is based primarily on BGP data. BGP peers are established at data centers having servers so that the routes that data would take to clients if served from each center can be observed. Generally, the client is mapped to a center whose routing table indicates that the client is "nearby". The most important criterion in decided whether a client is nearby is the number of AS hops on the path (number of different AS's encountered). The location of the next hop is also considered. If the next hop is located at a different hub or data center on the same backbone, then the client is served directly from that data center.

BGP peers participate in internal BGP (iBGP) sessions with routers at the different data centers. The alternative to iBGP is external BGP (eBGP). iBGP is preferred because the iBGP protocol specifies that next hop information pass unchanged from one BGP peer to another. As a result, BGP peer receives and stores a copy of the router's next hop. Essentially the peer stores a mirror image of the router's entire routing table. In eBGP, however, the router advertising a route replaces the next hop in that route with its own IP address. The simples way to configure the iBGP session is for the peer to be a route-reflector-client, and for the router to act as a route reflector. A "collector" BGP peer collects the routing tables from all of the other BGP peers. This machines establishes an eBGP session with each of the other BGP peers that send their routing tables to this machine. This machine is not involved in any iBGP peering sessions with routers.

The AS info identifies which Autonomous System a given CIDR Block belongs.

A number of CIDR blocks have VIP assignments. There are five types of VIP assignments: geographic, autonomous system, CIDR block, Keynote, and Keynote fix. All of these are entered manually except VIP assignments. These are generated automatically using Keynote performance logs. Keynote fix covers any Keynote assignments that can override existing Keynote assignments. VIP assignment are processed in the following order:
geographic
autonomous system
CIDR block
Keynote
Keynote fix In general, each of these five steps overrules the previous step. For example, if the geographic step maps a particular CIDR block to Exodus Virginia, but the autonomous system step maps the same block or a subset of the block to BBN Cambridge, then that block, (or its subset) is mapped to BBN Cambridge.

The file lookup/vip_geo makes broad VIP assignments based on geographic locations. This file permits the mapping for all addresses classified as belonging to a particular continent, country, state, or province to a particular data center or choice of data centers. Because geographic proximity is not necessarily an indicator of network performance, geographic VIP assignments should be made sparingly. At present, two reasons for mapping entire continents to UUNet are 1) that UUNet has good international connectivity, and 2) no data centers are outside of the U.S.

Because the assignment process will be executed periodically without manual intervention, an effort has been made to ensure that it succeeds in producing some assignment, given the input data, even if the input data imposes inconsistent requirements. In particular, it may not be possible to satisfy upper or lower bounds on the bandwidth of traffic served from each data center, due to insufficient traffic from the CIDR blocks listing that data center among their candidates. In this case the assignment process does its best.

The script creates a minimum-cost-flow-problem input instance that is fed into the CS-2 program. The resulting graph contains four layers. The first two layers form a large bipartite graph.

The left side of this bipartite graph contains a node for each CIDR block. Each of these nodes is a source with a positive flow supply, equal to the amount of flow predicted for the corresponding block in the tmp-tally file (whose creation is described in another document) The units of flow are in bits/second. If the prediction for a CIDR block is 0, it is increased to 1, ensuring that the block will be mapped somewhere.

The right side of the graph contains a node for each data center. These nodes are neither sources nor sinks for flow, as their supplies are 0.

Between a CIDR block on the left and every candidate data center for that block on the right is an edge (specified in tmp-candidates). Each edge has a capacity upper bound equal to the supply of the CIDR block, and with zero cost. The lower bound on the capacity of each of these edges is zero. Thus, all of the flow from a CIDR block could be carried along any one of the edges out of the block.

The CS-2 program requires that a flow be feasible. If the flow is not feasible, CS-2 does not return the largest flow that it can find, but instead returns only an error message. In designing the problem instance, capacities are set to ensure that some feasible solution exists. Sources of flow have been defined, but no sinks.

The graph contains a small set of auxiliary nodes that do not below to either the left or right side of the bipartite graphs.

The rightmost node is a sink. This is the only node in the fourth layer, and also the only node with a flow demand. The flow demand is equal to the sum of the flow supplies of all the CIDR blocks.

A set of intermediate nodes sits between the right-hand side of the bipartite graphs and the sink. Each of these nodes has in-degree one and out-degree one. The number of intermediate nodes is determined by the file lookup/assignment_grades. This file specifies a const function that is used in calculating how expensive it will be to use the bandwidth available at a data center. Each line in this file is an integer. If there are k lines in the file, then there will be k edges from each data center on the second layer of the graph to distinct nodes on the third layer. The cost per unit of flow on the i'th edge is set to be the cost indicated on the i'th line of the file. The lower bound on the capacity of each of these edges is 0. The upper bound on the capacity of each edge is the upper bound on the bandwidth for the data center divided by k, with one exception. The k'th edge has an upper bound on capacity equal to the sum of the supplies of all of the CIDR block. Typically the costs listed in lookup/assignment_grades increase with line number. The idea is that using the first 1/k of the capacity of a data center should be inexpensive, using the next 1/k should be a little more expensive, and so on. the last 1/k, and any overflow beyond the capacity of the data center should be most expensive. Note that the last edge alone makes it possible, but costly, to route all of the flow through a single data center.

Each node v in the third layer is connected by a single edge to the sink on the forth layer. Each of these edges has a capacity lower bound of zero and a cost of zero. The capacity upper bound is equal to the capacity upper bound of the edge from the second layer to v. Hence, any flow that makes it to the third layer can continue on to the fourth layer without additional cost.

The lower bounds are not enforced on flow indicated in the lookup/assignment_datacenters file by placed lower bounds on the opacities of edges, because to enforce the upper bounds, the flow problem might be infeasible, and in this case the program CS-2 oudl fail and return an error. The script bin/assignment-buildgraph is intended to always generate a graph for which a feasible flow exits.

To encourage data centers to meet their lower bounds, the cost for the edges corresponding to flow below the lower bounds is set to 0. If a data center, for example, has a lower bound that is 30% of its upper bound, and k is 10, then the first three edges with capacity k will have their costs set to 0, regardless of the values of these edges specified in the lookup/assignment_grades file.

The CS-2 program produces a feasible flow solution of minimum cost. The solution does not directly yield an assignment for each CIDR block, however, because the flow from a CIDR block to a sink may consist of multiple flow paths. It would be ideal if there were only one flow path for any CIDR block, but unfortunately the problem of finding a single-path feasible flow of minimum cost with varying flow values is difficult. If all flow values are the same and the graph is bipartite, the problem—called the assignment problem—can be solve in polynominal time.

The last step in the assignment process is to convert this multi-path flow into a single-path flow, which is equivalent to an assignment. A "randomized rounding" techniquest is used. The idea is to select from one of the multiple flow paths from a source node, i.e., a CIDR block on the first layer, to the sink at random, in proportion to the flow that is routed along each path. The following example helps to illustrate this concept. If 10 units of flow are routed from mode u to the sink, and the flow follows three paths with flow values of 2, 3, and 5, then the first path is selected with probability 2/10, the second with probability 3/10, and third with probability 5/10. It is possible to prove bounds on the effectiveness of this strategy, i.e., to prove that with high probability it is unlikely any data center will receive much more or much less flow than expected.

The problems solved are quite large, typically 150,000 CIDR blocks and 30+ data centers. The rounded solutions are usually very close in both the total cost and the flow imposed on any data center to the cost and flow of the minimum-cost multi-path solution. More sophisticated deterministic algorithms could be applied here. In particular, there is an algorithm that guarantees that no data center receives more flow than that imposed by the optimal solution plus the flow out of one CIDR block. For a bipartite graph, the algorithm is a degenerative case for converting multi-path flows to single-path flows.

The correspondence between the single-path flow and an assignment is straightforward. The first edge on the one flow path from a source node u on the first layer (a CIDR block) to the sink must be an edge from u to a node v on the second layer (a data center). The CIDR block for u is assignment to v. For this correspondence to produce an assignment for every CIDR block, there must be at least a unit of flow out of each node in the first layer. This is why one is added to any supplies with value 0 before invoking CS-2.

The above-described functionality of each of the components of the global hosting architecture preferably is implemented in software executable in a processor, namely, as a set of instructions or program code in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims:

1. A method for Internet content delivery, comprising:
    establishing a content delivery network at network locations, the content delivery network comprising a plurality of content servers for serving content resources, wherein the plurality of content servers includes a plurality of subsets of content servers, each subset located at one of a plurality of Internet data centers;
    for each Internet Protocol (IP) address block from which requests for content resources are expected to be received, generating a candidate list of Internet data centers to be used to service the requests for content resources, wherein the candidate list of Internet data centers is generated using (i) geographic information from one or more Internet registry databases identifying a geographic location of the IP address block, (ii) BGP route information collected from BGP peers participating in BGP (BGP) sessions, (iii) autonomous system (AS) information, and (iv) data collected from one or more network performance metric tests; and;

for the IP address block, selecting at least one of the Internet data centers from the candidate list to be used to service the requests for content resources, wherein the selected Internet data center is written into a network map, and wherein the selecting step is carried out concurrently for each IP address block from which requests for content resources are expected to be received such that the network map comprises the selected Internet data center for each IP address block;

providing the network map to a domain name service (DNS) associated with the content delivery network; and in response to a DNS query received at the domain name service associated with the content delivery network, using the network map to identify one of the Internet data centers from the candidate list to be used to service a request for a content resource.

2. The method for Internet content delivery as described in claim 1 wherein the selecting step is performed by executing an algorithm.

3. The method for Internet content delivery as described in claim 2 wherein the algorithm is a multi-commodity bipartite, min-cost flow algorithm.

4. The method for Internet content delivery as described in claim 3 wherein the flow algorithm uses a graph that includes a first set of nodes, and a second set of nodes, wherein a node of the first set of nodes represents an IP address block and a node of the second set of nodes represents a single link at an Internet data center on the list of candidate data centers.

5. The method for Internet content delivery as described in claim 4 wherein a node of the first set of nodes is connected to a node of the second set of nodes by a link that has a communication cost associated therewith.

6. The method for Internet content delivery as described in claim 1 wherein the BGP sessions include internal BGP (iBGP) sessions.

7. The method for Internet content delivery as described in claim 1 wherein the content resources include a web resource.

8. The method for Internet content delivery as described in claim 1 wherein the selected Internet data center is nearby the IP address block.

* * * * *